J. H. WHITELAW.
COMBINED TABULATING AND CHECK INDORSING APPARATUS.
APPLICATION FILED FEB. 23, 1907.
964,723.
Patented July 19, 1910.
2 SHEETS—SHEET 1.
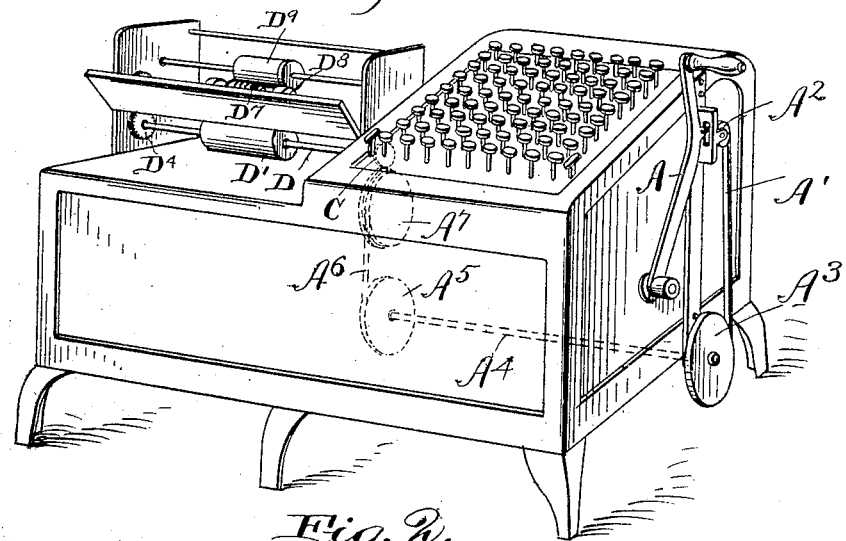
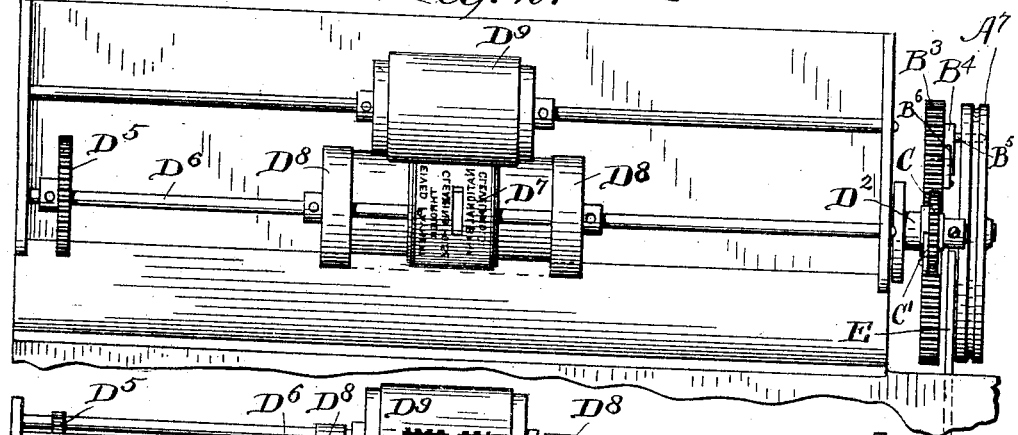
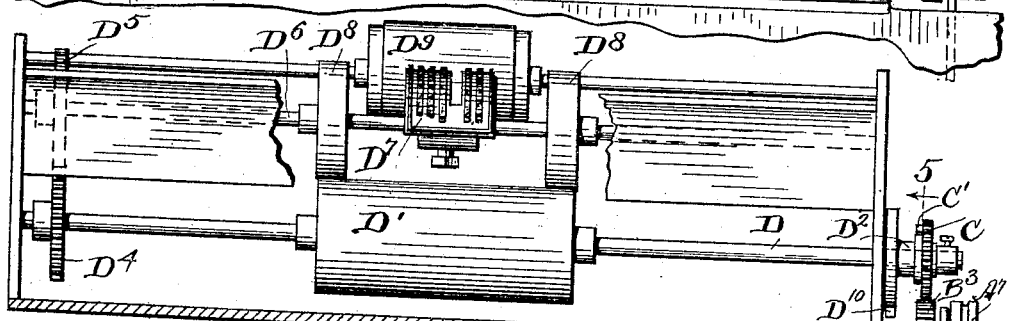

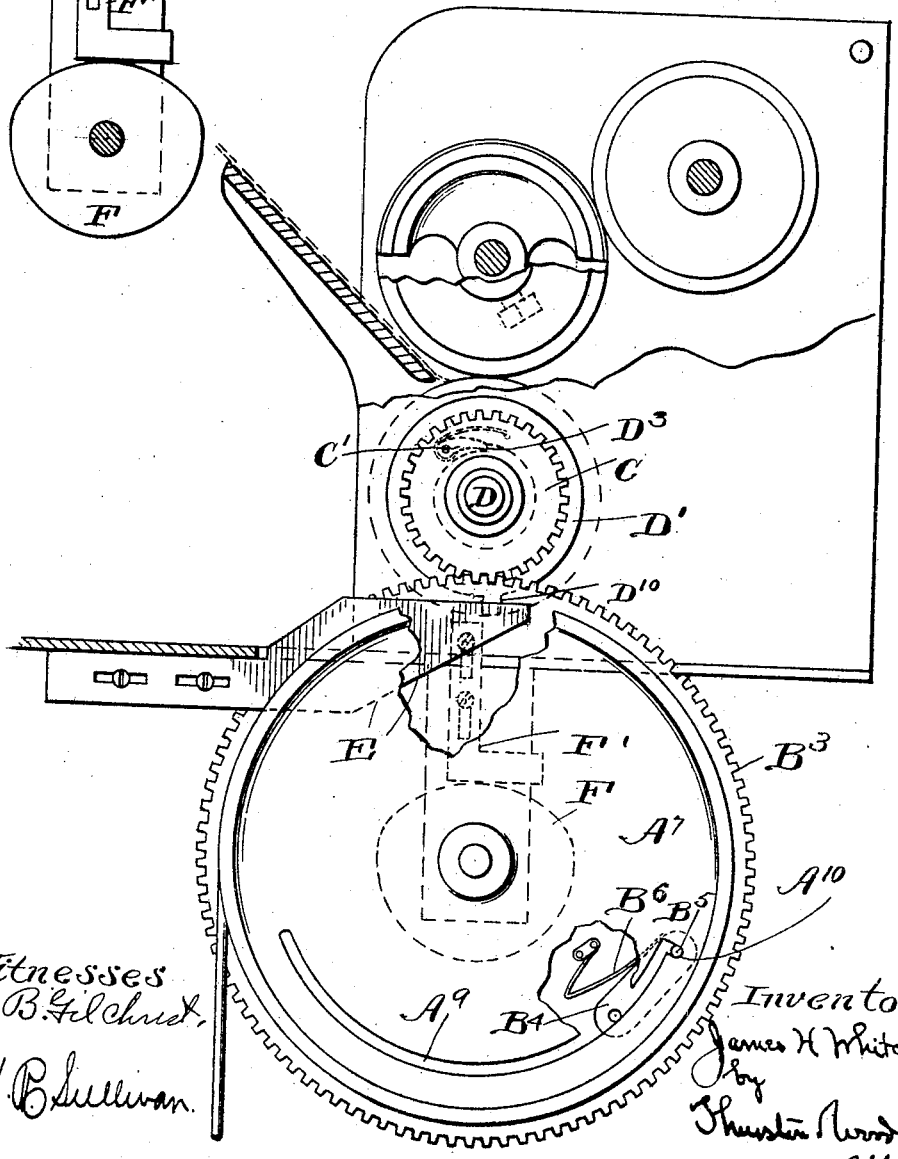

UNITED STATES PATENT OFFICE.

JAMES H. WHITELAW, OF CLEVELAND, OHIO.

COMBINED TABULATING AND CHECK-INDORSING APPARATUS.

964,723.   Specification of Letters Patent.   Patented July 19, 1910.

Application filed February 23, 1907. Serial No. 358,798.

*To all whom it may concern:*

Be it known that I, JAMES HERBERT WHITELAW, a citizen of the United States, residing at Cleveland, in the county of Cuyahoga and State of Ohio, have invented a certain new and useful Improvement in Combined Tabulating and Check-Indorsing Apparatus, of which the following is a full, clear, and exact description.

The object of the present invention is to provide a combined recording and indorsing apparatus.

My purpose is to so combine the recording and indorsing apparatus that the work of recording the amounts of the bank checks and the indorsement thereof, in clearing houses or elsewhere, may be effected simultaneously by the operator, and I have particularly directed my attention to accomplishing this in such manner that the simultaneous action shall be positive and definite in its results and yet have the operating connections so arranged that such positive stoppage of parts of one portion of the apparatus, as may be necessary in operation, will not injure the other operating parts.

With the tabulating or recording machines now in use, there is no means provided for anything more than the mere recording and computing of the various sums which the operator may elect. In the handling of a large number of bank checks, with the present machines, the operator will first record the various sums appearing on the checks, and as each individual check is thus recorded, it is laid to one side until the entire bundle has been properly tabulated. It is then necessary to either immediately indorse these checks with whatever indorsement the particular bundle should have or otherwise keep the several bundles together and separate them out at some subsequent time and place the proper indorsement thereon.

It is the purpose of my machine to provide means whereby the checks may be indorsed simultaneously with their recording and thus avoid the double handling and possible oversight in the matter of indorsement.

Referring to the accompanying drawings which illustrate an embodiment of my invention, Figure 1 is a perspective view of my combined apparatus. Fig. 2 is a plan view showing the connecting mechanism for the indorsing stamp. Fig. 3 is a vertical elevation, partly broken away, of the mechanism of Fig. 2. Fig. 4 is an enlarged end view of the connections for the indorsing stamp, partly in section and partly broken away. Fig. 5 is a detail looking from the line 5—5 of Fig. 3 showing the cam and sliding stop by which the feed roll and its connected parts are brought to rest at the close of each operation.

The tabulating or recording mechanism is provided with the usual actuating hand-lever A which is to be drawn forward by the operator to effect the recording of each sum, said lever transmitting motion to the recording mechanism by means of the gearing shown in dotted lines in Fig. 1, or by any other suitable connections. Attached to this actuating member, at a suitable point, which may be varied according to the throw of the individual machine, is a strap $A'$, passing over a guiding pulley $A^2$ and attached to the rim of a disk $A^3$ fixed to the end of a transversely disposed shaft $A^4$ swung in brackets in suitable position on the body or casing of the machine. This shaft has thereon a second disk $A^5$, to the rim of which is secured a strap $A^6$, passing to an oscillatory slotted disk $A^7$. This oscillatory disk is preferably provided with a groove to guide the strap $A^6$, by which it is oscillated, and is fixed to a shaft $A^8$ rotatably mounted within a sleeve B, which, in turn, is rotatably mounted in suitable hangers, see Fig. 3. The shaft $A^8$ and the sleeve B are independent of each other in their rotary movement, and each is subject to the influence of a coil spring, which springs tend to rotate each of them backwardly, the rotation of the sleeve being limited by a lug $B'$ projecting from the sleeve, which lug $B'$ takes against a stop $B^2$ on the frame.

Carried on the end of the sleeve B, adjacent to the oscillatory disk, is a gear. $B^3$ having a spring catch $B^4$ thereon, through the medium of which it may be drawn forward a certain distance by the movement of the oscillating disk. This catch consists of a pivoted link having a pin $B^5$ projecting therefrom through an arcual slot $A^9$ in the disk $A^7$, this slot being of greater length than the normal extent of oscillation. A spring $B^6$ on the gear tends to press the link outward so that the pin will be thrown into a notch $A^{10}$ at the end of the arcual slot $A^9$ when the notch and pin happen to be on the same radius. Inasmuch as the sleeve B is, under the tension of the coil spring thereon, thrown backward until the limiting stop is reached and inasmuch as the shaft $A^8$, on which the slotted disk is mounted, is also under the influence of its coil spring tending to throw the disk in the same direction, the disk will rotate until the end of the slot $A^9$ is stopped by the pin $B^5$ projecting therethrough, at which point, of course, the pin is thrown into the notch $A^{10}$ which has come into radial alinement with it. Upon the drawing forward of this disk, by the movement of the actuating handle, A, the gear $B^3$ fixed to the before mentioned sleeve B will be drawn forward through the medium of this pin and slot connection. Meshing with this gear $B^3$ is a small pinion C loosely mounted on a transversely extending shaft D, to which shaft is fixed a feed roll $D'$ for receiving and carrying the checks while being indorsed. Secured to this shaft D is a spool $D^2$ having at one end a flange with a ratchet tooth $D^3$ thereon through the medium of which a spring pressed pawl $C'$ carried by the aforesaid pinion C transmits rotary motion to the shaft D and feed roll $D'$. Also secured to this shaft D is a gear $D^4$ coöperating with a second gear $D^5$ fixed to a shaft $D^6$ on which the rotary indorsing stamp $D^7$ is mounted, this second shaft also carrying friction rolls $D^8$ which coöperate with the main feed roll. In the path of the rotary indorsing stamp is also mounted a rotary inking pad, $D^9$. When the slotted disk and the gear, connected therewith through the pin and slot connection, have advanced forward, each against the tension of its controlling spring, to a certain point, the pin passes under an adjustable cam E fixed to the machine frame, the effect of which is to press the pin down out of the notch $A^{10}$ in the disk and thus free the rotating gear $B^3$ from its connection with the disk. The cam is preferably adjusted so that this will take place at a point within the limit to which the oscillating disk $A^7$ is drawn through the medium of its connection with the actuating handle A. Upon the release of the pin $B^5$ from the notch $A^{10}$ and the consequent backward throw of the sleeve B and gear $B^3$, pinion C, being loosely mounted on the shaft D, also rotates backward and carries with it the spring pressed pawl $C'$ to its initial position, without retarding or affecting such forward movement as the feed roll $D'$ and the stamp $D^7$ may tend to have due to momentum.

Coincidentally with the forward movement of the large gear $B^3$, a cam F fixed to the same sleeve B rotates in such manner as to lift upward a sliding stop $F'$ which is advanced into the path of a lug $D^{10}$ projecting from a flange on the spool $D^2$ fixed to the shaft D on which the feed roll is mounted. Since the cam F is, like the gear $B^3$, fixed to the sleeve B, it will have a simultaneous forward movement with the gear $B^3$, during which motion the stop $F'$ will be raised, and it will, upon the release and backward movement of the gear $B^3$, also be thrown backward allowing the stop $F'$ to fall practically simultaneously with the forcing of the pin $B^5$ out of the notch $A^{10}$. It will therefore be seen that, when, owing to the quick forward movement of the actuating handle of the machine, the feed roll and rotary stamp are thrown forward, the motion will be a positive one until the gear is released from the oscillatory slotted disk. As soon as the gear is thus released, the pinion C, driven by it, ceases to drive the feed roll forward and allows this feed roll and the rotating stamp to go such distances farther as their momentum will carry them, until the stop $D^{10}$ on the feed roll shaft comes in contact with the reciprocating stop $F'$ operated by the cam F on the sleeve B bearing the large gear $B^3$. Thus a positive binding of the mechanism is avoided, since in actual practice, the feed roll and rotating stamp, which rotate forwardly through one complete revolution at each successive operation, when once started by the quick motion of the operator's handle, move faster than the pinion C and the pawl $C'$, which give them their initial motion, and the stop lug $D^{10}$ on the feed roll shaft thus comes in contact with the sliding stop $F'$ before the latter is allowed to drop back upon the release of the pin $B^5$ from the notch $A^{10}$. This, or an equivalent flexible connection, is quite valuable to prevent binding of the mechanism and distortion of the same due to such strains. Further, it is desirable to have the pin and slot, or an equivalent driving connection, between the disk and the gear, in order that a definite limit of forward movement may be given to the gear $B^3$ without giving a shock to the disk, which is, at the time of release of the gear, subject to a positive forward draw from the actuating handle of the machine. After the release of the gear, further forward movement of the disk is determined simply by the throw of the actuating handle, and, although opposed in this movement by its tension spring, there is, nevertheless, no shock transmitted through the actuating handle to the recording and computing mechanism, or to the other parts of the mechanism, by reason of a certain stoppage of the forward movement of the said gear.

With the mechanism described, the operator, after punching the keys setting the sum to be recorded, drops the check on the feed shelf, so that it falls upon the feed roll underneath the rotating stamp, and then pulls the actuating handle forward to actuate the various sub-mechanisms. The sum is recorded in the usual way and the check simultaneously receives whatever indorsement is provided for on the rotary stamp, which stamp is preferably removable so that different bundles of checks may receive different indorsements if it is so desired. And it is to be noted that with the arrangement of mechanism, which I have provided, or with an equivalent arrangement, the operation of these various sub-mechanisms will be such that there will be no shock transmitted to the other through the actuating handle or through any other portion of the mechanism, and yet, the various parts are stopped and brought to an absolutely definite and fixed position at the end of each operation.

With this machine, when the tabulation of a series of checks is completed, the checks have all received their proper indorsement and are ready to be delivered to the proper department without further delay or chance for confusion or annoyance.

Having thus described my invention, I claim:

1. In a machine of the class described, the combination with an actuating member for recording mechanism, of an indorsing stamp, connections between said member and stamp to cause the latter to be actuated by the former, and means to disengage said connections at a certain point in the movement of the stamp.

2. In a machine of the class described, the combination with an actuating member for recording mechanism, of an indorsing stamp, connections between said member and stamp to cause the latter to be actuated by the former, means to disengage said connections at a certain point in the movement of the stamp, and means for stopping the stamp at a farther point in its movement.

3. In a machine of the class described, the combination with an actuating member for recording mechanism, of a rotary indorsing stamp, connections between said member and stamp to cause the latter to be rotated when said member is actuated, means to disconnect the stamp from said member at a certain point in the movement of the former, and means to stop said stamp after it has made one revolution.

4. In a machine of the class described, the combination with a manually-operated reciprocatory actuating member for recording mechanism, and a spring to return said member to its initial position, of a rotary indorsing stamp, a rotary member, carrying a pawl adapted to rotate said stamp in one direction, and normally operatively connected to said actuating member, means to disconnect said rotary and actuating members at a certain point in the rotation of the former, and means to subsequently positively stop said stamp.

5. In a machine of the class described, the combination with an actuating member for recording mechanism, of a rotary indorsing stamp and a coöperating feed roll, means connected to said actuating member to rotate said stamp and roll during a portion of the movement of said actuating member, and means to subsequently positively stop said stamp and roll.

6. In a machine of the class described, the combination with an actuating member for recording mechanism, of a rotary indorsing stamp and a coöperating feed roll carried by parallel shafts geared together to rotate in opposite directions, a rotary member operatively connected to said actuating member, a gear loosely mounted on one of said parallel shafts and carrying a pawl adapted to drive said shaft in one direction only, means normally connecting said gear to said rotary member so that it will be rotated thereby and drive said shafts, and means to disconnect said gear from said disk at a certain point.

7. In a machine of the class described, the combination with an actuating member for recording mechanism, of a rotary indorsing stamp and a coöperating feed roll carried by parallel shafts geared together to rotate in opposite directions, a rotary member operatively connected to said actuating member, a gear loosely mounted on one of said parallel shafts and carrying a pawl adapted to drive said shaft in one direction only, means normally connecting said gear to said rotary member so that it will be rotated thereby and drive said shafts, means to disconnect said gear from said disk at a certain point, means to return said gear and disk to their initial positions, and means to positively stop said stamp and roll shafts.

8. In a machine of the class described, the combination with an actuating member for recording mechanism, of a rotary member operatively connected to said actuating member, a second rotary member journaled coaxially with the first and normally connected thereto, means to disconnect said rotary members at a certain point in their rotation, a spring to return said second rotary member, an indorsing stamp, connections between the same and said second rotary member, whereby the latter rotates, said stamp while connected to said first rotary member but has no effect on said stamp during its return movement, means to stop said stamp after it is disengaged from said second rotary member, and means to limit the return movement of the latter.

9. In a machine of the class described, the combination with a pivoted handle for recording mechanism, of a rotary member operatively connected to said handle, a second rotary member, spring-controlled means to normally connect said members, means to disconnect them at a certain point in their rotation, a shaft carrying an indorsing stamp, a gear driven by said second rotary member and carrying a pawl which drives said shaft in one direction only, a spring to return said second rotary member, as soon as it is released from said first rotary member, means to limit the return movement thereof, and means to stop the rotation of said shaft after it has ceased being driven by said pawl.

In testimony whereof, I hereunto affix my signature in the presence of two witnesses.

JAMES H. WHITELAW.

Witnesses:
H. R. SULLIVAN,
E. B. GILCHRIST.